May 28, 1929.  G. F. ECKART  1,715,124

SHOCK CUSHIONING DRIVE

Filed Oct. 1, 1927

Inventor:
George F. Eckart,
By Dyrenforth, Lee, Chritton and Wiles,
Attys.

Patented May 28, 1929.

1,715,124

UNITED STATES PATENT OFFICE.

GEORGE F. ECKART, OF SOUTH BEND, INDIANA, ASSIGNOR TO GEORGE A. CHRITTON, TRUSTEE.

SHOCK-CUSHIONING DRIVE.

Application filed October 1, 1927. Serial No. 223,375.

This invention relates to shock-cushioning drives or the like, and is particularly adapted to be used upon a propeller shaft of an automobile. One of its primary objects is to act as a flexible coupling between the engine and the rear axle, thereby smoothing out the impulses of the engine and rendering the action of the car much smoother.

The invention is fully described, in its preferred embodiment, in the following specification and shown in the accompanying drawings, in which—

Figure 1:
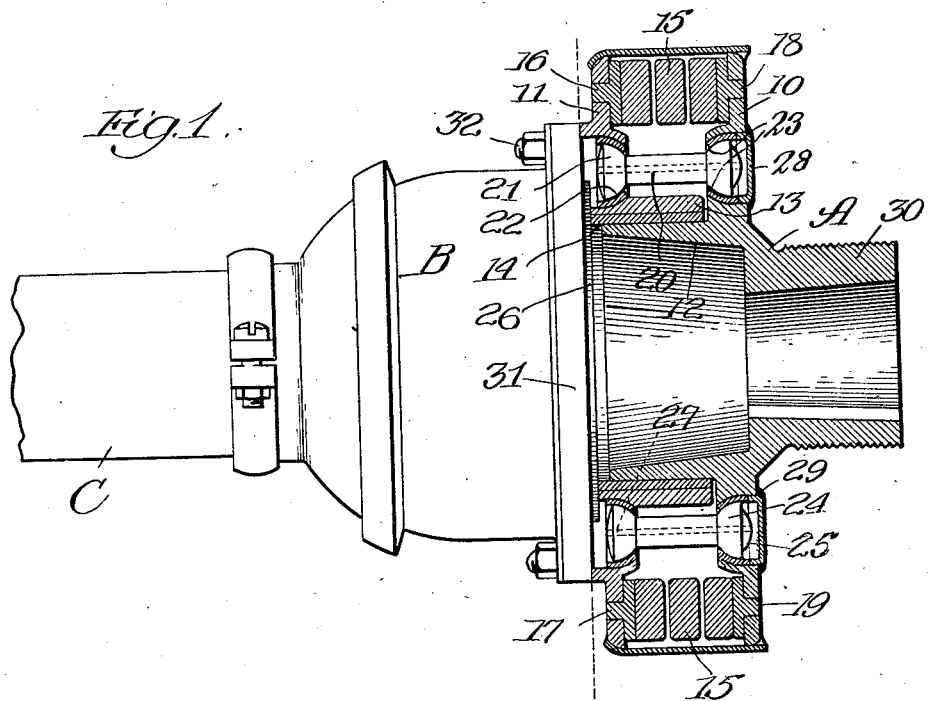
Figure 1 is a longitudinal section on the line 1—1 of Fig 2.
Figure 2:
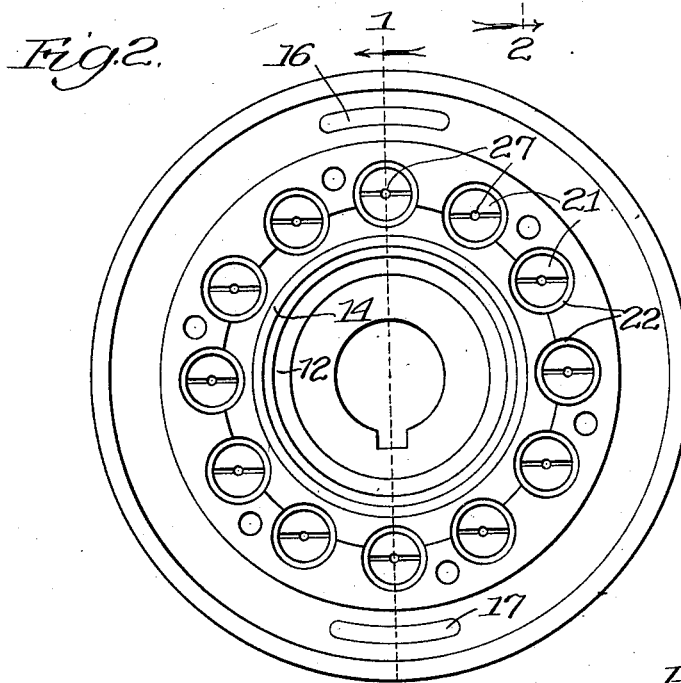
Fig. 2 is a front elevation on the line 2 of Fig. 1.

This invention is an improvement on my Patent No. 1,337,646, granted April 20, 1920.

The embodiment illustrated comprises a shock-cushioning drive or coupling A which is shown secured to a universal coupling B of a well known type which is driven by a propeller shaft C in a well known manner.

The shock-cushioning drive or coupling A is made up essentially of two parallel facing flanges 10 and 11, the flange 10 having a concentric cylindrical boss 12 upon which is journaled a boss 13 carried by the flange 11 with the sleeve 14 between the two bosses of a suitable bearing metal.

The flanges 10 and 11 carry a spring therebetween, each end of the spring having two oppositely disposed keys 16 and 17 which are arcuate in form and which lie on the same circle concentric with the axis of the coupling. These keys fit snugly into similarly shaped openings in the flange 11. A similar pair of keys 18 and 19 fit into similarly shaped arcuate openings in the flange 10. The use of this type of key insures a firm and even bearing of the spring upon the flange.

This spring normally tends to press the flanges 10 and 11 apart and these flanges are held in normal relation by means of radius rods 20 which are made in the form of bolts having spherical heads 21 which fit into spherical cups 22 in the flange 11, while the opposite flange 10 carries similar cups 23 into which fit spherical nuts 24 which are screwed upon the threaded and shouldered ends of the rods or bolts 20. After being assembled the outer end 25 of the screw and nut are firmly secured together by means of arc-welding or the like. These radius rods or bolts are subjected to heavy pressure when the device is in operation, and it is essential that these radius rods or bolts shall not become unfastened.

It is also very necessary that these spherical heads and cups be properly lubricated. For this purpose the inner portion 26 is cut away, as shown, so that heavy grease and oil within the universal coupling B will find its way out to the heads 21 of the radius rods. These rods are perforated longitudinally and have a drilled hole or other passage 27 through which oil may gradually pass from one end of the rod to the other. The outer end of the radius rod 20 is covered by means of a stamped metal cap 28 which makes a snug fit within the outer end of the opening carrying the lining cups 23.

The springs 15 are pressed between the flanges 10 and 11 after which the radius rods 20 are put in place and the nuts 24 screwed down until they are all at substantially the same tension. The ends 25 are then electrically welded so that the relation of these parts cannot readily change thereafter. The caps 28 are then pressed into place and these may also be secured, if desired, by means of electric weldings 29.

The flange 10 is provided with a centrally disposed hub 30 which is finished to adapt it to the particular form of differential shaft of the automobile on which it is to be used.

The other end of the shock-cushioning drive or cup is closed by means of the flange 31 of the universal coupling B and is retained by means of bolts 32.

Thus, it will be seen that a very simple and economical form of shock-cushioning drive is provided which can readily be placed between the rear universal coupling B and the differential shaft (not shown) of the automobile. If desired of course this shock-cushioning drive may be placed at the forward end of the propeller shaft rather than at the rear. In either position, it absorbs much of the impulse of each individual cylinder of the engines and gives up this energy between the working strokes so that it acts as a flexible coupling between the engine and the rear axle thereby greatly smoothing out the impulses of the engine and rendering the whole action of the car much smoother.

While I have shown and described but a single embodiment of my invention, it is to be understood that it is capable of many modifications. Changes therefore may be made in the construction and arrangement which do not depart from the spirit and scope of the invention as disclosed in the appended claims.

I claim:

1. In an enclosed flexible coupling, a pair of opposing flanges, a series of radius rods having spherical ends, sockets in said flanges adapted to receive said spherical ends, said coupling being provided with an opening on one side communicating with the sockets in one flange, a universal joint connected to the coupling and having an opening communicating with said first mentioned opening of said coupling, and means for enclosing the outer ends of the sockets in the other flange, said rods having means for carrying lubricant from the sockets in one flange to the sockets in the other.

2. In an enclosed flexible coupling, a pair of opposing flanges, a series of radius rods having spherical ends, sockets in said flanges adapted to receive said spherical ends, said coupling being provided with an opening on one side communicating with the sockets in one flange, a universal joint connected to the coupling and having an opening communicating with said first-mentioned opening, and means for enclosing the outer ends of the sockets in the other flange, said rods having longitudinal holes therethrough for carrying lubricant from the sockets in one flange to the sockets in the other.

3. In an enclosed flexible coupling, a pair of opposing flanges, a series of radius rods having spherical ends, sockets in said flanges adapted to receive said spherical ends, said coupling being provided on one side with an opening, and a universal joint connected to the coupling, said opening of the coupling communicating on one side with said universal joint and on the other side with the sockets in one flange.

4. In an enclosed flexible coupling, a pair of opposing flanges, a series of radius rods having spherical ends, sockets in said flanges adapted to receive said spherical ends, said coupling being provided on one side with an opening, a universal joint connected to the coupling, said opening communicating on one side with said universal joint and on the other side with the sockets in one flange, and means for enclosing the outer ends of the sockets in the other flange.

In testimony whereof, I have hereunto set my hand this 23rd day of September, 1927.

GEORGE F. ECKART.